(12) United States Patent
Yin

(10) Patent No.: US 7,578,699 B2
(45) Date of Patent: Aug. 25, 2009

(54) COMPUTER ENCLOSURE WITH CONNECTOR

(75) Inventor: Xiu-Zhong Yin, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 0 days.

(21) Appl. No.: 11/858,130

(22) Filed: Sep. 20, 2007

(65) Prior Publication Data
US 2009/0042439 A1    Feb. 12, 2009

(30) Foreign Application Priority Data
Aug. 10, 2007   (CN) .................. 2007 2 0200806 U

(51) Int. Cl.
*H01R 13/73* (2006.01)
(52) U.S. Cl. ................... 439/553; 439/544; 439/362
(58) Field of Classification Search ........... 439/544, 439/536, 553, 569, 572, 545
See application file for complete search history.

(56) References Cited

U.S. PATENT DOCUMENTS

| 3,176,260 A | * | 3/1965 | Pascucci | 439/553 |
| 4,124,267 A | * | 11/1978 | Mines et al. | 439/553 |
| 5,123,721 A | * | 6/1992 | Seo | 439/362 |
| 5,921,801 A | * | 7/1999 | O'Sullivan et al. | 439/362 |

* cited by examiner

*Primary Examiner*—Briggitte R Hammond
*Assistant Examiner*—Vanessa Girardi
(74) *Attorney, Agent, or Firm*—Frank R. Niranjan

(57) ABSTRACT

A computer enclosure includes a chassis (10) and a connector (30). The chassis includes a bottom panel (11) and a side panel (13) perpendicular to the bottom panel. The side panel defines an opening (131). A positioning flange (15) protrudes from the side panel parallel to the bottom panel. Two resilient hooks (17) extend from the side panel at opposite sides of the opening. The connector is mounted in the opening. The connector includes a first face (32), a second face (34) parallel to the first face and a top wall (36) perpendicular to the first and second faces. Two ends of the first face are engaged with the corresponding resilient hooks. The second face abuts against the side panel. The positioning flange abuts against the top wall of the connector, thereby the connector is sandwiched between the positioning flange and the bottom panel.

17 Claims, 7 Drawing Sheets

COMPUTER ENCLOSURE WITH CONNECTOR

BACKGROUND

1. Field of the Invention

The present invention relates to computer enclosures, and more particularly to a computer enclosure with a connector.

2. Description of related art

Generally, a plurality of connectors is used in a computer for conveniently connecting an audio device, a video device, a storage device and other peripheral devices to the computer. The connectors are usually mounted to a computer panel for ease of use. Typically, a connector is secured to a bracket by bolts or screws, and then the bracket is fixed to the computer panel also by bolts or screws. This method needs a plurality of bolts or screws in the assembly process and adds to cost. In addition, the assembly process is laborious and time-consuming, and also brings inconvenience to users.

What is needed, therefore, is a computer enclosure with a connector which has a simple structure and a low cost for convenient installation and removal of the connector.

SUMMARY

A computer enclosure includes a chassis and a connector. The chassis includes a bottom panel and a side panel perpendicular to the bottom panel. The side panel defines an opening therein. A positioning flange protrudes from the side panel parallel to the bottom panel. Two resilient hooks extend from the side panel perpendicular to the positioning flange at opposite sides of the opening. The connector is mounted in the opening of the chassis. The connector includes a first face, a second face parallel to the first face and a top wall perpendicular to the first and second faces. Two ends of the first face are respectively engaged with the corresponding resilient hooks. The second face abuts against the side panel. The positioning flange abuts against the top wall of the connector, thereby the connector is sandwiched between the positioning flange and the bottom panel.

Other advantages and novel features of the present invention will become more apparent from the following detailed description of a preferred embodiment when taken in conjunction with the accompanying drawings, in which:

DETAILED DESCRIPTION

Figure 1:
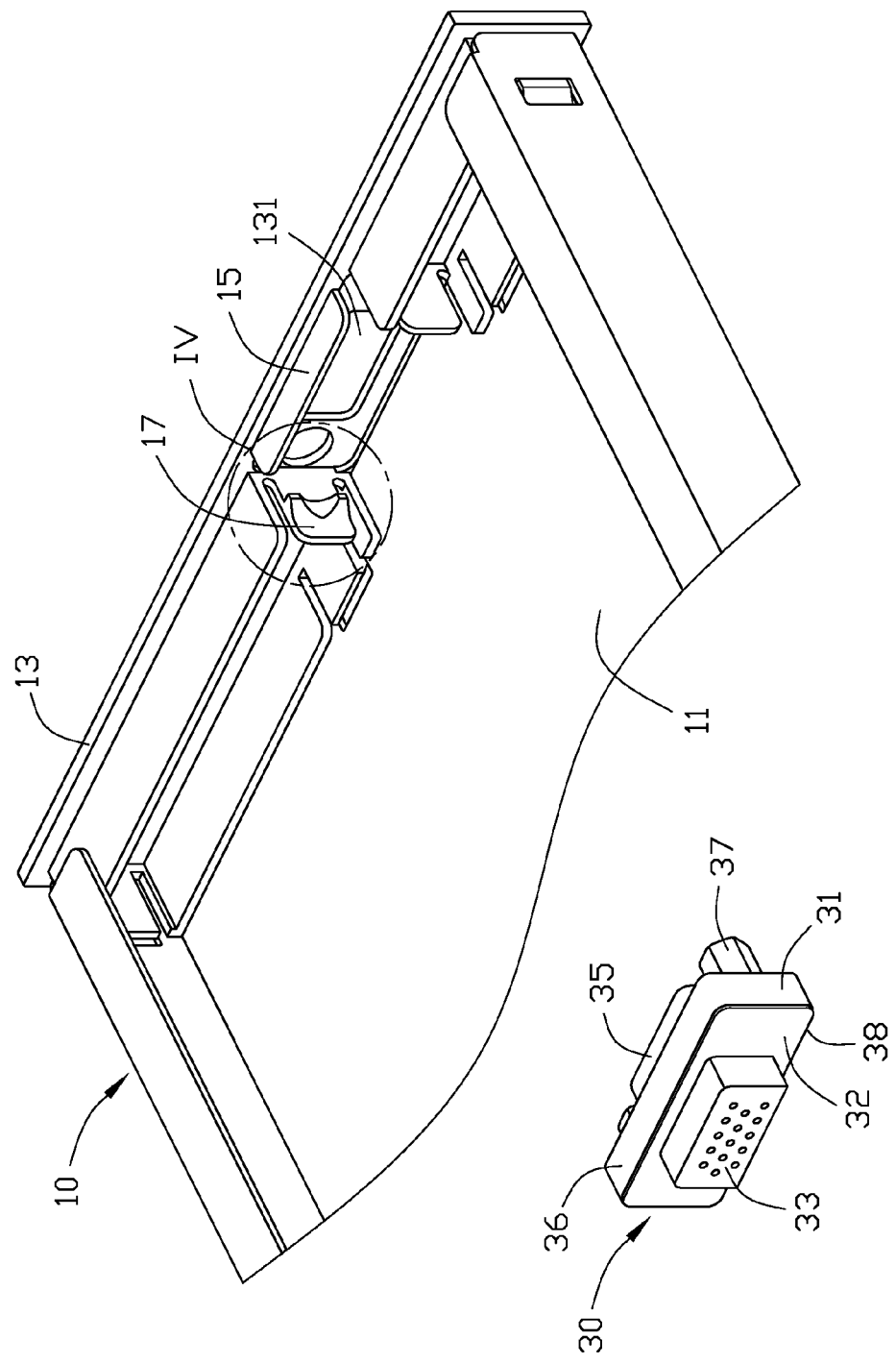
FIG. 1 is an exploded, isometric view of a computer enclosure with a connector in accordance with an embodiment of the present invention.
Figure 2:
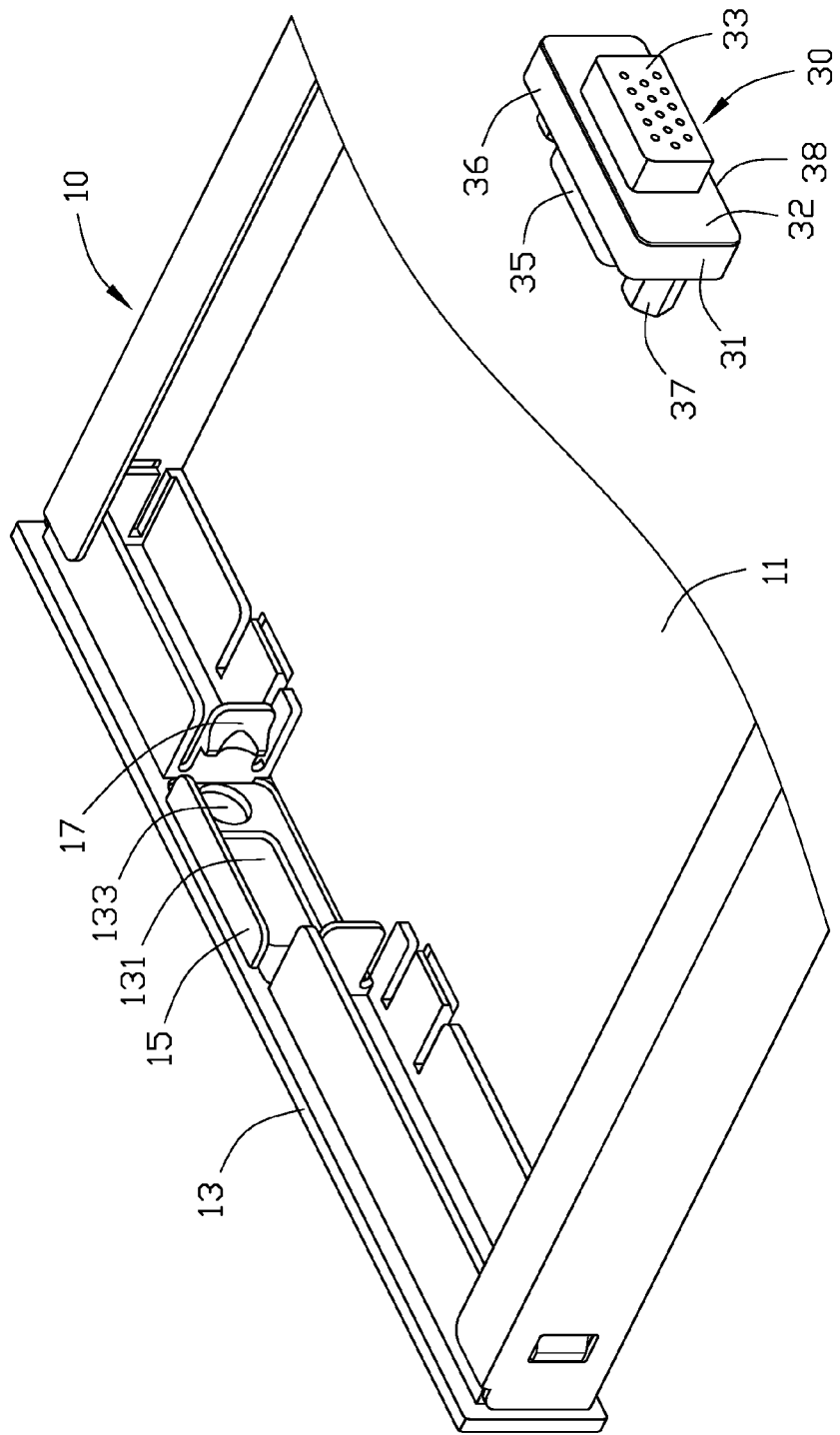
FIG. 2 is similar to FIG. 1, but viewed from another aspect.
Figure 3:
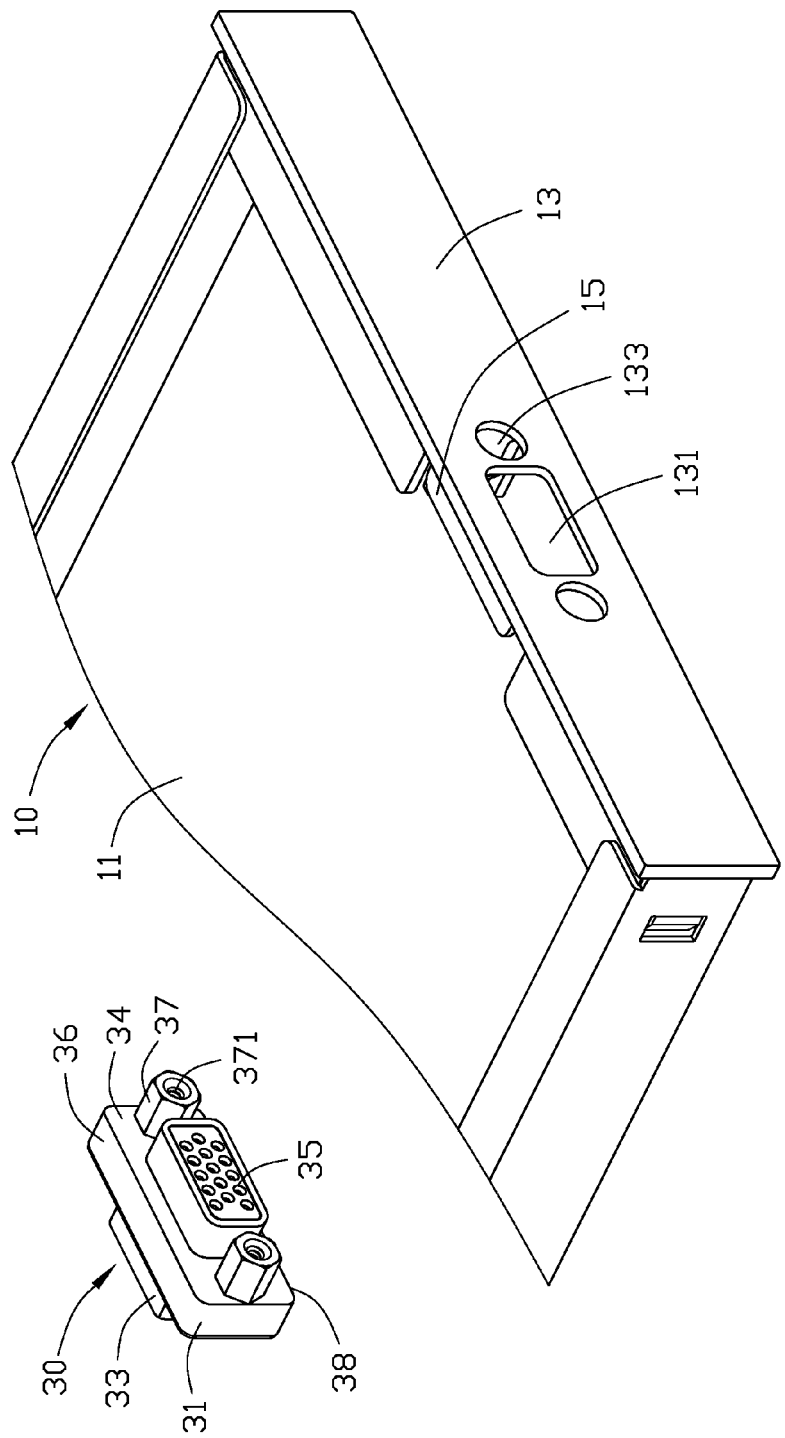
FIG. 3 is similar to FIG. 1, but viewed from a third aspect.

Referring to FIGS. 1 to 3, a computer enclosure with a connector of an embodiment of the present invention includes a chassis 10, and a connector 30 detachably mounted in the chassis 10.

The connector 30 includes a main body 31 having a top wall 36, a bottom wall 38, a first face 32 and a second face 34 parallel to the first face 32. A first connector port 33 protrudes from a center of the first face 32 for communicating with a device in the chassis 10. A second connector port 35 protrudes from a center of the second face 34 for communicating with a device outside the chassis 10. Two screw posts 37 are respectively disposed on the two opposite sides of the second connector port 35 of the second face 34. Each screw post 37 defines a screw hole 371 therein. In this embodiment, the first and second connector ports 33, 35 are both Video Graphics Array (VGA) ports, and the main body 31 is rectangular.

The chassis 10 includes a bottom panel 11, and a side panel 13 generally perpendicular to the bottom panel 11. A rectangular opening 131 is defined in the side panel 13, corresponding to the second connector port 35 of the connector 30. Two circular mounting holes 133 are respectively defined in the two opposite sides of the opening 131, corresponding to the screw posts 37 of the connector 30. Sizes of the opening 131 and the mounting holes 133 are the same as that of the corresponding second connector port 35 and screw posts 37 of the connector 30. The second connector port 35 and the screw posts 37 of the connector 30 extend through the opening 131 and the mounting holes 133 to be exposed outside of the side panel 13, and engage in the opening 131 and the mounting holes 133, thereby preventing the connector 30 moving parallel to the side panel 13 in the chassis 10. A positioning flange 15 extends perpendicularly from the side panel 13 above the opening 131. A distance between the positioning flange 15 and the bottom panel 11 is the same as that between the top wall 36 and the bottom wall 38 of the connector 30, thereby preventing the connector 30 moving between the positioning flange 15 and the bottom panel 11.

Figure 4:
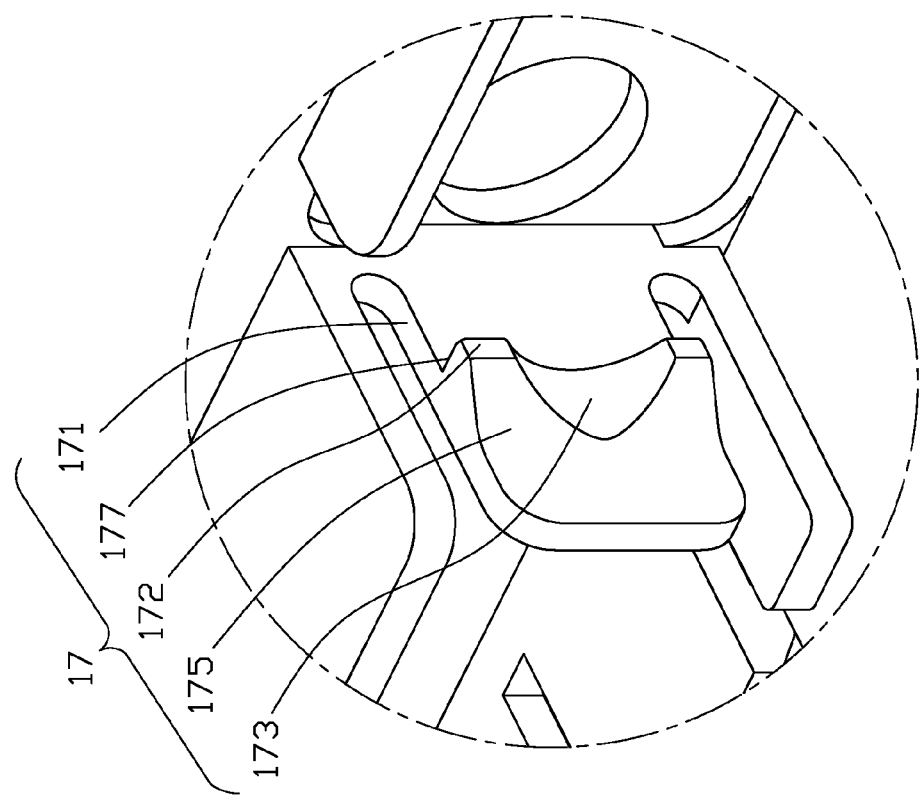
FIG. 4 is an enlarged isometric view of a resilient hook of FIG. 1.

Referring also to FIG. 4, a resilient hook 17 protrudes perpendicularly from the side panel 13 at a side away from the opening 131 of each mounting hole 133 respectively. Each resilient hook 17 includes an elastic cantilever 171 and a clasp 172 protruding from a free end of the elastic cantilever 171 towards the opening 131. Each clasp 172 has a slantwise guide surface 175 forming an angle with the elastic cantilever 171 and a blocking surface 177 perpendicular to the elastic cantilever 171. A guide slot 173 is defined in each clasp 172 for facilitating the corresponding screw post 37 of the connector 30 passing through the corresponding mounting hole 133. A distance between the elastic cantilevers 171 of the two resilient hooks 17 is the same as a length of the main body 31 of the connector 30, a distance between the blocking surface 177 of each resilient hook 17 and the side panel 13 is the same as that between the first face 32 and the second face 34 of the connector 30, thereby the blocking surfaces 177 of the two resilient hooks 17 engage with two ends of the first face 32 and blocking the connector 30 on the side panel 13. The second face 34 of the connector 30 abuts against an inner surface of the side panel 13, thereby preventing the connector 30 moving perpendicular to the side panel 13. A receiving space is formed among the positioning flange 15, the bottom panel 11, and the two resilient hooks 17 for receiving and fixing the connector 30 therein.

Figure 5:
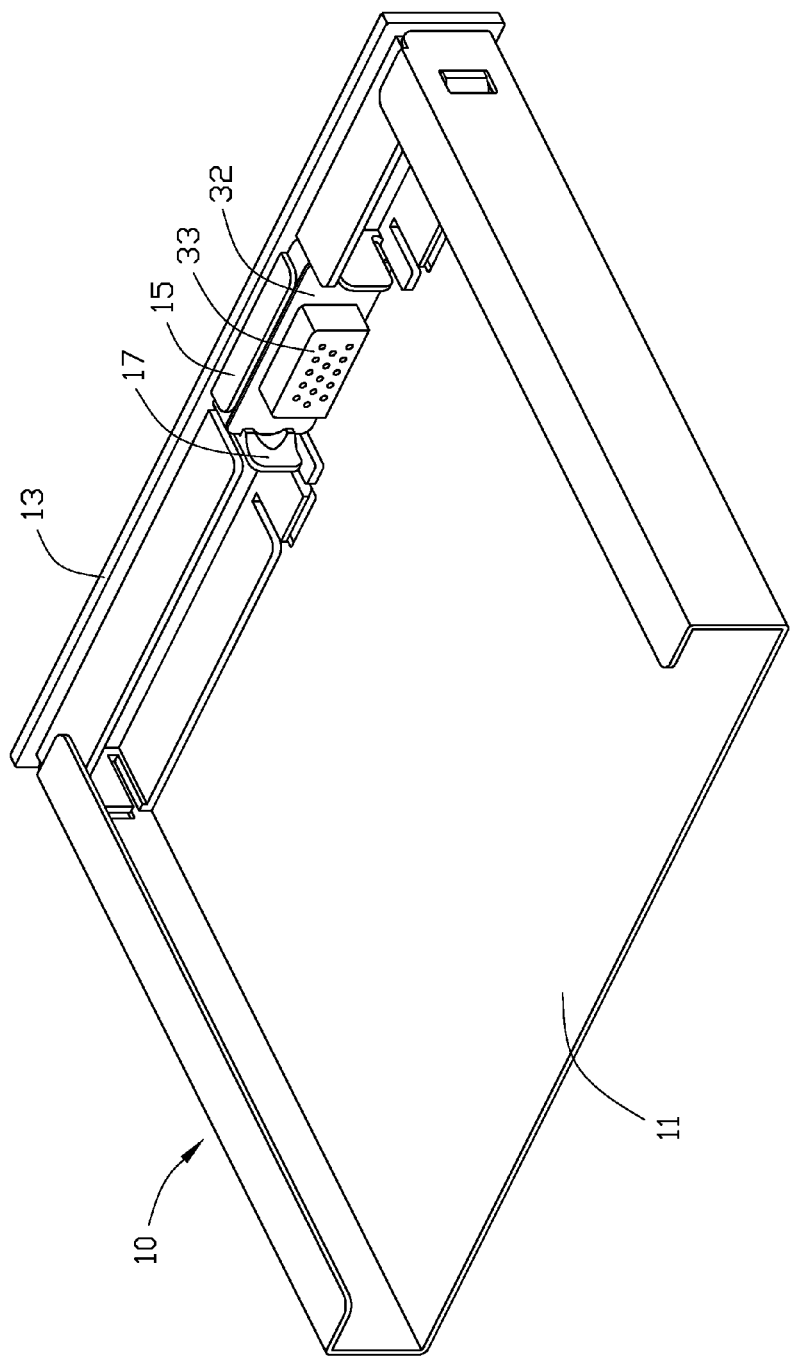
FIG. 5 is an assembled view of the computer enclosure with the connector of FIG. 1.
Figure 6:
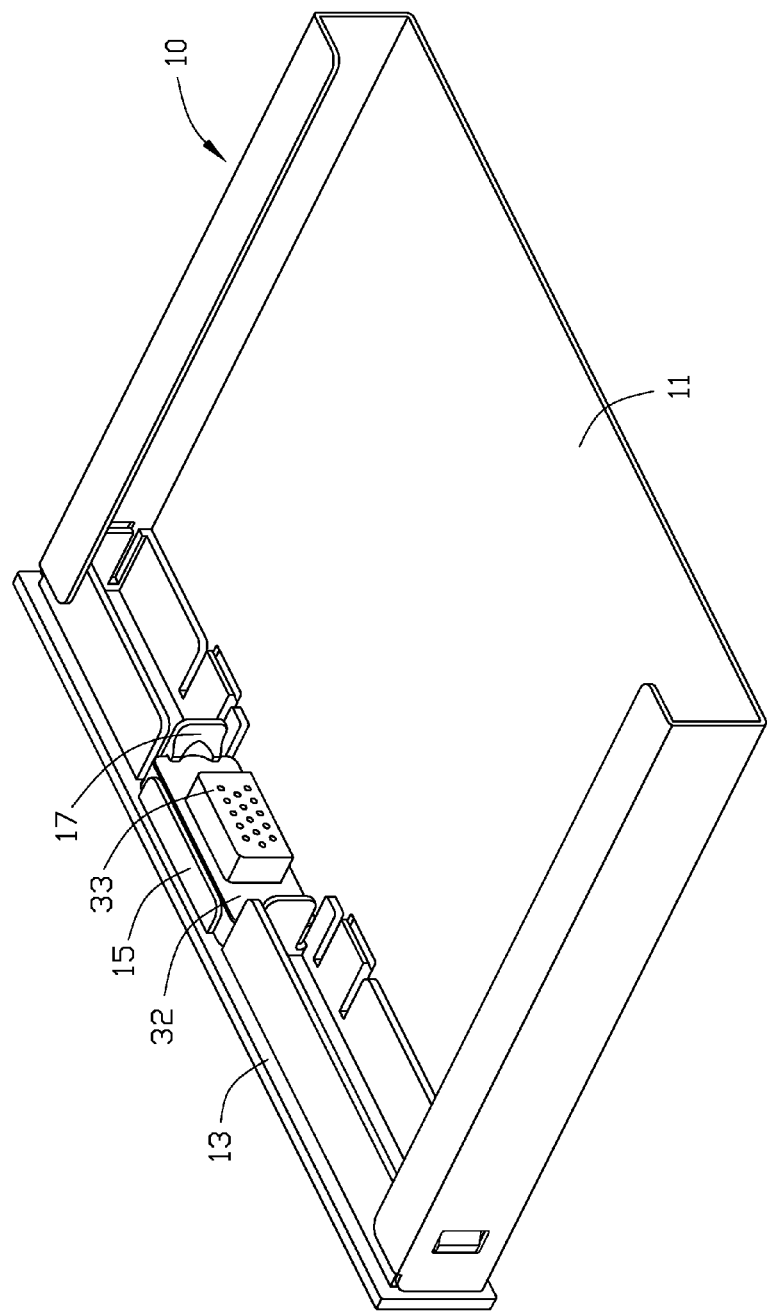
FIG. 6 is similar to FIG. 5, but viewed from another aspect.
Figure 7:
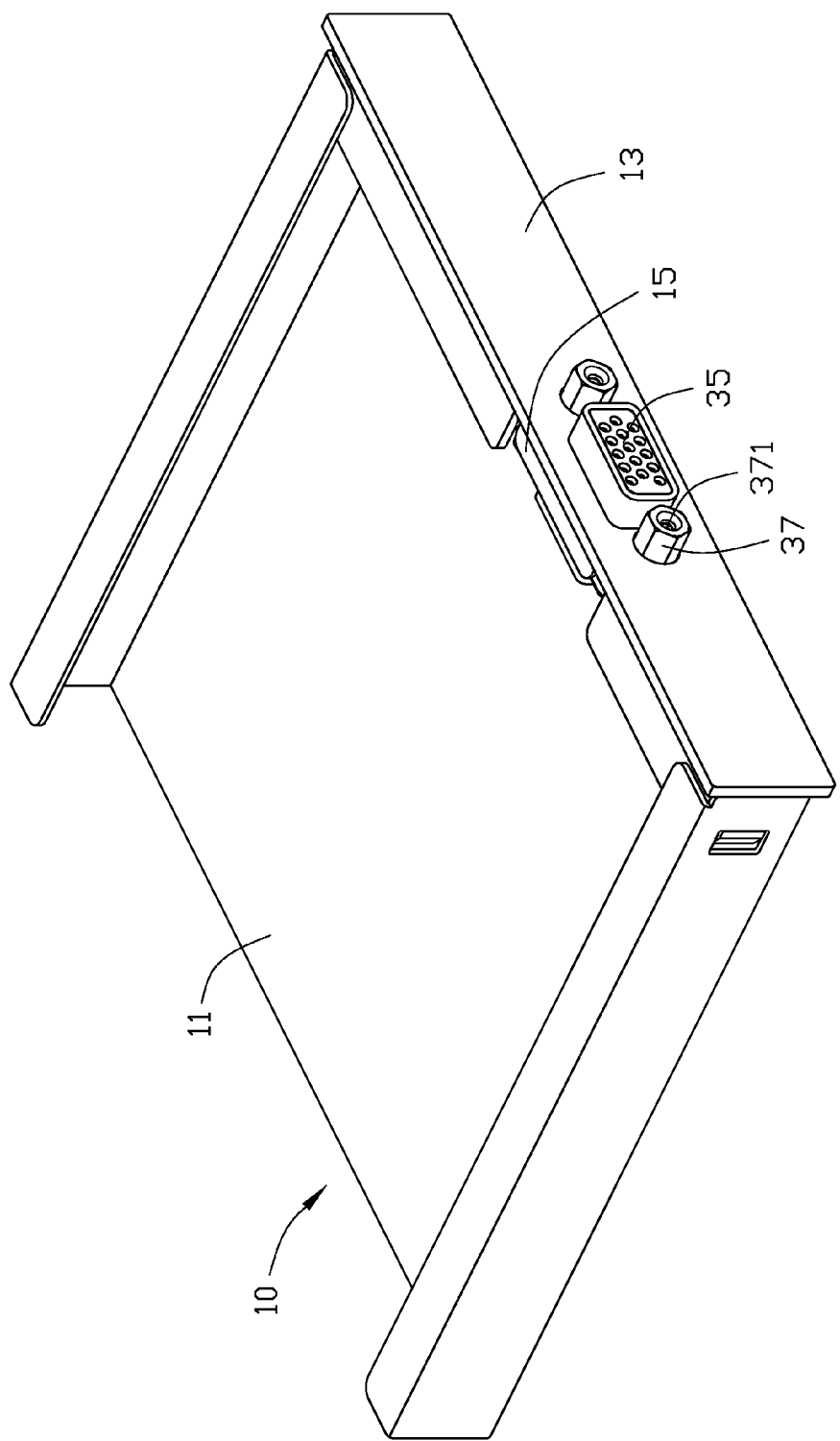
FIG. 7 is similar to FIG. 5, but viewed from the third aspect.

Referring also to FIGS. 5 to 7, in assembly, the connector 30 is pushed towards the side panel 13 of the chassis 10. When the main body 31 of the connector 30 is moved to the guide surfaces 175 of the two resilient hooks 17, the clasps 172 of the two resilient hooks 17 are urged by two opposite sides of the main body 31 to deform elastically away from the connector 30 respectively. When the screw posts 37 of the connector 30 are respectively horizontally inserted into the corresponding mounting holes 133 of the side panel 13 through the guide slots 173 of the corresponding resilient hooks 17, and the second connector port 35 is inserted into the opening 131, the resilient hooks 17 rebound back to their initial states. At this time, the two ends of the first face 32 are respectively blocked by the blocking surfaces 177 of the two resilient hooks 17. The inner surface of the side panel 13 abuts against the second face 34 of the connector 30. The connector 30 is pressed under the positioning flange 15, and the top wall 36 and the bottom wall 38 of the connector 30 abut against the positioning flange 15 and the bottom panel 11 of the chassis 10 respectively. Thus, the connector 30 is secured onto the side panel 13 of the chassis 10 and received in the receiving space formed among the positioning flange 15, the bottom panel 11, and the two resilient hooks 17.

In disassembly, the resilient hooks 17 are respectively pulled away from the connector 30 to force the resilient hooks 17 to deform elastically. When the blocking surfaces 177 of the two resilient hooks 17 disengage from the two ends of the first face 32, the connector 30 can be removed from the side panel 13 of the chassis 30 horizontally.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A computer enclosure comprising:
   a chassis comprising a bottom panel and a side panel perpendicular to the bottom panel, the side panel defining an opening therein, a positioning flange protruding from the side panel parallel to the bottom panel, two resilient hooks extending from the side panel perpendicular to the positioning flange at opposite sides of the opening; and
   a connector mounted in the opening of the chassis, the connector comprising a first face, a second face parallel to the first face, and a top wall perpendicular to the first and second faces, two screw posts being disposed on the second face of the connector, and the side panel of the chassis defining two mounting holes with the corresponding screw posts extending therethrough, two ends of the first face being respectively engaged with the corresponding resilient hooks, the second face abutting against the side panel, the positioning flange abutting against the top wall of the connector, thereby the connector being sandwiched between the positioning flange and the bottom panel.

2. The computer enclosure as claimed in claim 1, wherein a receiving space is formed among the positioning flange, the bottom panel, and the two resilient hooks of the side panel receiving and fixing the connector therein.

3. The computer enclosure as claimed in claim 1, wherein the connector has a connector port on the second face extending through the opening of the side panel and being exposed outside of the side panel.

4. The computer enclosure as claimed in claim 2, wherein each resilient hook comprises an elastic cantilever and a clasp protruding from the elastic cantilever towards the opening.

5. The computer enclosure as claimed in claim 4, wherein each clasp has a guide surface slanted relative to the elastic cantilever and a blocking surface perpendicular to the elastic cantilever for engaging with the two ends of the first face of the connector.

6. The computer enclosure as claimed in claim 5, wherein a distance between the elastic cantilevers of the two resilient hooks is the same as a length of the first face or the second face of the connector.

7. The computer enclosure as claimed in claim 5, wherein a distance between the blocking surface of each resilient hook and the side panel is the same as that between the first face and the second face of the connector.

8. The computer enclosure as claimed in claim 4, wherein the two screw posts are respectively disposed on the connector at opposite sides of the connector port, the two resilient hooks respectively protrude perpendicularly from the side panel adjacent to the corresponding mounting holes.

9. The computer enclosure as claimed in claim 8, wherein the clasps of the two resilient hooks respectively define a guide slot for facilitating the corresponding screw post of the connector extending through the corresponding mounting hole by sliding through the corresponding resilient hook.

10. An electronic device comprising:
    a connector having a first and a second connector port arranged thereon, two screw posts being disposed on two opposite sides of the second connector port; and
    a chassis comprising a side panel, the connector detachably mounted in the chassis and attached to the side panel, the side panel defining an opening with the second connector port of the connector extending therethrough and being exposed outside of the side panel, and two mounting holes with the corresponding screw posts extending therethrough, a size of the opening being equal to that of the second connector port, thereby preventing the connector from moving parallel to the side panel, two resilient hooks perpendicularly protruding from the side panel at opposite sides of the opening, the two resilient hooks clamp the connector at a back thereof against the side panel, thereby preventing the connector from moving perpendicular to the side panel.

11. The electronic device as described in claim 10, wherein the chassis further comprises a bottom panel perpendicular to the side panel, a positioning flange extends perpendicularly from the side panel adjacent the opening for sandwiching the connector between the positioning flange and the bottom panel.

12. The electronic device as described in claim 11, wherein a receiving space is formed among the positioning flange, the bottom panel and the two resilient hooks for receiving and fixing the connector therein.

13. The electronic device as described in claim 10, wherein each resilient hook comprises an elastic cantilever and a clasp protruding from a free end of the elastic cantilever towards the opening.

14. The electronic device as described in claim 13, wherein each clasp has a guide surface slanted relative to the elastic cantilever and a blocking surface perpendicular to the elastic cantilever for blocking the connector on the side panel.

15. The electronic device as described in claim 13, wherein The clasps of the two resilient hooks respectively define a guide slot for facilitating the corresponding screw post of the connector extending through the corresponding mounting hole by sliding through the corresponding resilient hook.

16. The electronic device as described in claim 13, wherein the connector comprises a first face and a second face parallel to the first face, the second connector port is disposed on the second face, a distance between the blocking surface of each resilient hook and the side panel is the same as that between the first face and the second face of the connector.

17. The electronic device as described in claim 16, wherein the first connector port is formed on the first face of the connector for connection to a device in the chassis.

* * * * *